2,977,324
CATALYSTS

Dennis Albert Dowden and Alexander Muirhead Ure Caldwell, Norton-on-Tees, England, assignors to Imperial Chemical Industries Limited, London, England, a corporation of Great Britain No Drawing. Filed June 20, 1958, Ser. No. 743,468
Claims priority, application Great Britain June 26, 1957
9 Claims. (Cl. 252—443)

This invention relates to catalysts which are particularly suitable for the oxidation of aromatic hydrocarbons to oxygen-containing organic compounds.

Processes for the oxidation of organic compounds, especially hydrocarbons, in the vapour phase by means of oxygen-containing gases in the presence or absence of catalysts, such as vanadia, are well-known, but have not proved entirely satisfactory, primarily due to the difficulties in avoiding combustion to carbon oxides, and in preventing the highly exothermic process from getting out of control.

The present invention provides catalysts the use of which does not lead to the combustion of a substantial part of the starting material to carbon oxides and in consequence enables the oxidation process to be relatively easily controlled.

According to the present invention, catalysts suitable for the oxidation of aromatic hydrocarbons to oxygen-containing compounds are produced by a process comprising the steps of bringing a molten catalytic material comprising a vanadyl vanadate, as hereinafter defined, into contact with particles of a porous heat-resistant solid and allowing the product to cool, whereby there is obtained a catalyst comprising the support impregnated with solid vanadyl vanadate.

The term "vanadyl vanadate" as used in this specification means a single solid phase or a mixture of solid phases, produced by the processes hereinafter disclosed, each phase containing at least one of the metals thallium, silver, potassium, sodium, lithium or rubidium, together with oxides of vanadium, in which at least a part of the vanadium atoms have a valency of from 2 to 4. It should be noted that alternative names exist for vanadyl vanadates. They are, for example, also known as vanadico-vanadates or hypo-vanadato-vanadates.

The preferred catalysts provided by the present invention are supported potassium vanadyl vanadate and supported thallium vanadyl vanadate. In these, the $$M_2O : V_2O_5$$

molar ratio (where M is potassium or thallium) may be within the range of 0.001:1 to 0.3:1 but is conveniently of the order of 0.05:1.

Supports suitable for use in producing catalysts of the present invention are, for example, corundum, silica, silicon carbide or firebrick. In general, any high-melting porous ceramic material is suitable providing that this does not contain injurious constituents.

The process of the present invention may be carried out by fusing together vanadium pentoxide and the appropriate salt, for example, a potassium or thallium salt, preferably potassium carbonate or thallium carbonate. The molten material may then be cooled, this being accompanied by the evolution of oxygen and the formation of the desired vanadyl vanadate. This vanadyl vanadate is then melted again and particles of the support, graded to the desired size, are introduced and then quickly withdrawn to just above the surface of the molten mass. Here, the coated particles are heated to a temperature above the melting point of the vanadyl vanadate so that molten vanadyl vanadate drains from the impregnated support. This process is repeated several times. In this way it is possible to coat the internal pore structure of the support with vanadyl vanadate.

Alternatively the support may be dipped into the melt before the evolution of oxygen and the formation of vanadyl vanadate, so that the oxygen evolved during the solidification and formation of vanadyl vanadate assists the formation of a porous vanadyl vanadate structure within the pores of the support.

As yet another alternative, the support may be impregnated with soluble salts of vanadium pentoxide and the other metal to be present, for example, thallium nitrate, and the impregnated support may then be calcined so that the vanadyl vanadate is formed within the pores of the support.

Catalysts produced by the process of the present invention are extremely hard and rugged. These properties are advantageous in either fixed bed or fluidised bed operations. In fixed bed operations the lower part of the bed can more readily withstand the weight of the upper part and in consequence crushing of the lower part of the catalyst bed, with concomitant pressure drop, does not occur.

Since most of the catalytic material is embedded in the pore structure of the support, the abrasion resistance of the catalyst is essentially that of the support itself. This is a particular advantage in fluidised bed operations, where attrition is a severe disadvantage, leading to the production of fine particles of catalysts which choke the filters, interfere with space velocity requirements and contaminate the product by becoming entrained in the gas stream. Furthermore, the prevention of catalyst attrition provides a catalyst with a longer life and in consequence new catalyst charges are required less frequently.

If desired, the catalysts produced by the process of the present invention may be tumbled before use in order to remove any vanadyl vanadate adhering to the external surface.

The catalysts are preferably employed in the form of particles or pieces which have sizes within a relatively narrow range. If it is desired to operate with the catalyst in a very finely divided form, the particles should preferably be capable of retention by a 1/32" sieve, but able to pass a 3/64" sieve. If a catalyst in the form of larger granules is preferable, these granules may conveniently grade between 1/8" and 3/16".

The catalysts of the present invention are activated by operating for the first few hours at a temperature higher than that at which it is ultimately desired to work. For example, in the oxidation of naphthalene to phthalic anhydride, initial operation at 450° C. is advantageous, if it is desired to operate eventually at 425° C. After carrying out the oxidation for eight hours at 450° C., the temperature may be decreased to 425° C. The activity of the catalyst does not fall accordingly, but remains substantially at the value attained at 450° C., insofar as phthalic anhydride production is concerned. There is, however, less tendency at 425° C. than at 450° C. for undesirable combustion of the naphthalene to carbon oxides and water.

The catalysts produced by the process of the present invention may be employed, for example, in the oxidation of toluene to benzoic acid; ortho-xylene or naphthalene to phthalic anhydride; meta or para-di-isopropyl benzene to meta or para-di-isopropyl benzoic acid; benzene to maleic acid or maleic anhydride.

In general, the oxidation of aromatic hydrocarbons using catalysts produced by the process of the present invention is operated at a temperature in the range of 300–

550° C., the optimum temperature depending upon the starting material to be oxidised. Thus, the oxidation of naphthalene to phthalic anhydride is conveniently carried out at a temperature of the order of 425-450° C., while the oxidation of ortho-xylene to phthalic anhydride is conveniently carried out at temperatures of 450-500° C.

Compounds other than aromatic hydrocarbons may be oxidised using the catalysts of the present invention. They include, for example, paraffins and olefines, each of which must contain at least three carbon atoms; aldehydes, which yield carboxylic acids, and ketones. These compounds are preferably oxidised at temperatures in the range of 250° C. to 500° C. Thus, on oxidising isobutene with air (air : isobutene volume ratio of 85:15) at 400° C., a product is obtained which comprises formaldehyde, acetic acid, glyoxal, propionic acid and methacrolein.

*Example 1*

1.29 gm. of thallium carbonate and 10 gm. of vanadium pentoxide were ground together and fused. The melt was agitated for some time to ensure homogeneous mixing and then allowed to cool. During the cooling stage, oxygen was evolved. The thallium vanadyl vanadate thus formed was re-melted; particles of alpha alumina were dipped into the melt, quickly withdrawn and allowed to drain. The particles of alpha alumina employed in this process were of a size which enabled them to be retained by a ⅛" sieve but to pass a 3/16" sieve. The dip procedure was repeated until the alpha alumina was fully impregnated with thallium vanadyl vanadate. The weight of thallium vanadyl vanadate incorporated into the alpha alumina was between 5 and 10%. The catalyst was tumbled for one hour to remove any excess vanadyl vanadate adhering to the external surfaces. After this treatment, the abrasion resistance of the catalyst mass became similar to that of the support.

A mixture of 21.2 grams of ortho-xylene vapour and 480 litres of air was passed over 50 mls. of the thallium vanadyl vanadate supported on alpha alumina prepared as described above. The catalyst bed occupied a 3" length of a reactor tube, 30" long and 1.25" in diameter, and was heated electrically. At an operating temperature of 500° C., ortho-xylene was converted to phthalic anhydride with a conversion of 64.1% and a pass yield of 35.5%.

*Example 2*

20 mls. of a catalyst comprising thallium vanadyl vanadate supported on alpha alumina, prepared as described in Example 1, was charged to a reactor and an air-naphthalene mixture (air : naphthalene volume ratio 20.3:1) was passed over it at a rate of 5,000 litres per hour per litre of catalyst-filled space, the catalyst being maintained at a temperature of 446° C. The amount of naphthalene converted was found to be 44.4% and the pass yield of phthalic anhydride was 33.5%. The pass yield of ultimate conversion products, that is $CO_2+CO+H_2O$, was 2.6%.

For comparison, the same reaction was carried out using a catalyst comprising fused vanadium pentoxide supported on alpha alumina; conditions of operation were otherwise identical. The naphthalene conversion was 89% and the phthalic anhydride pass yield was 43.7%. The pass yield of ultimate oxidation products, that is $CO_2+CO+H_2O$, was 34.1%.

*Example 3*

Example 1 was repeated using 0.774 gm. of thallium carbonate and 10 gm. of vanadium pentoxide. As before, the catalyst produced contained between 5 and 10% of thallium vanadyl vanadate based on the weight of alpha alumina. The catalyst was again tumbled for 1 hour to remove any excess of thallium vanadyl vanadate adhering to the external surfaces, and after this treatment the abrasion resistance and strength of the catalyst mass were similar to those of the alpha alumina.

This catalyst was tested by charging 20 ml. of it to a metal reactor and passing an air-naphthalene mixture, with an air : naphthalene volume ratio of 20:1, over it at a space velocity of 5,000 litres per litre of catalyst-filled space per hour. The temperature of the catalyst was maintained at 425° C. 84% of naphthalene was converted, the pass yield of phthalic anhydride being 54%. The pass yields of by-products were:

| | Percent |
|---|---|
| Phthalic acid | 0.1 |
| Maleic acid | 4 |
| Benzoic acid | 4 |
| 1:4 naphthaquinone | 4 |
| $CO_2+CO+H_2O$ | 19 |

In order to carry out a comparative experiment, alpha alumina was impregnated with a solution of vanadyl chloride and the product was calcined in steam. A catalyst was obtained which contained 6-7% by weight of vanadium pentoxide. By the process described earlier in this example, 20 ml. of this catalyst were used in the oxidation of naphthalene. The conditions employed were exactly the same as those previously given. 99.3% of the naphthalene was converted to phthalic anhydride, the pass yield of which was 49%. The pass yields of by-products were:

| | Percent |
|---|---|
| Phthalic acid | 2.5 |
| Maleic acid | 7.0 |
| Benzoic acid | 2.5 |
| 1:4 naphthaquinone | 0.2 |
| $CO_2+CO+H_2O$ | 40.5 |

In particular it will be noted that the quantity of $CO_2+CO+H_2O$ was more than twice the amount previously produced.

*Example 4*

A catalyst was produced, exactly as described in Example 1, using 0.258 gm. of thallium carbonate and 10 gm. of vanadium pentoxide.

This catalyst was tested exactly as described in Example 3 except that the temperature of operation was 450° C. 97% of the naphthalene was converted, the pass yield of phthalic anhydride being 70%. The pass yields of by-products were:

| | Percent |
|---|---|
| Phthalic acid | 1 |
| Maleic acid | 8 |
| Benzoic acid | 4 |
| 1:4 naphthaquinone | 2.5 |
| $CO_2+CO+H_2O$ | 14 |

A comparative example was carried out exactly as described in Example 2. 99.5% of the naphthalene was converted, the pass yield of the phthalic anhydride being 40%. The pass yields of by-products were:

| | Percent |
|---|---|
| Phthalic acid | 1.5 |
| Maleic acid | 7.0 |
| Benzoic acid | 2.5 |
| 1:4 naphthaquinone | 0.2 |
| $CO_2+CO+H_2O$ | 51 |

From these results it is evident that the quantity of $CO_2+CO+H_2O$ was between 3 and 4 times as great when using a conventional catalyst.

*Example 5*

A catalyst was produced from 0.774 gram of thallium carbonate and 10 gm. of vanadium pentoxide by the process identical with that used in Example 1. This catalyst was used in the oxidation of naphthalene, the conditions being identical with those employed in Example 2. 97% of naphthalene was converted, the pass yield of phthalic anhydride being 64%, and the pass yields of by-products were:

| | Percent |
|---|---|
| Phthalic acid | 0.1 |
| Maleic acid | 5 |
| Benzoic acid | 2.5 |
| 1:4 naphthaquinone | 3.5 |
| $CO_2 + CO + H_2O$ | 25 |

Example 6

Silver carbonate (0.104 gm.) and vanadium pentoxide (10 gms.) were ground together and fused. The melt was agitated to ensure homogeneous mixing, and then allowed to cool. The silver vanadyl vanadate thus formed was re-melted. Particles of porous alpha alumina, capable of passing a 3/16" sieve, but of being retained by a 1/8" sieve, were dipped into the melt, quickly withdrawn and allowed to drain. This procedure was repeated five times, the internal pore structure of the support being impregnated in this way with silver vanadyl vanadate. The weight of silver vanadyl vanadate incorporated into the alpha alumina in this manner was 5%. This material was tumbled for 1 hour to remove any silver vanadyl vanadate adhering relatively loosely to the surface.

20 ml. of this catalyst were charged to a metal reactor and a mixture of air and naphthalene in a volume ratio of 20:1 was passed over the catalyst at a space velocity of 5,000 litres per litre of catalyst-filled space per hour. The catalyst was maintained at a temperature of 420° C. Of the naphthalene passed through the reactor, 78% was converted, the pass yield of phthalic anhydride being 46%.

A second sample of catalyst was heated at 450° C., the air-naphthalene gas mixture being passed through as before. The temperature was lowered after 8 hours to 420° C.; at this temperature the conversion of the naphthalene was 84% and the pass yield of phthalic anhydride was 59%. The improvement resulting from the activation process is very noticeable.

Similarly, a catalyst activated as in the preceding paragraph at 450° C. was employed under the conditions described above for naphthalene oxidation at 400° C. The conversion of naphthalene was 65% and the pass yield of phthalic anhydride was 50%. When using an unactivated catalyst at 400° C. the conversion of naphthalene was only 10% and the pass yield of phthalic anhydride was 3.3%.

Example 7

1.36 grams of thallium carbonate and 10 grams of vanadium pentoxide were ground together and fused. The melt was allowed to cool. The thallium vanadyl vanadate thus formed was re-melted and fused on to alumina as described in Example 1. The dipping procedure was repeated until the catalyst contained 5% by weight of thallium vanadyl vanadate.

30 ml. of this catalyst were charged to a reactor and a gas mixture comprising 85 parts by volume of air and 15 parts by volume of isobutene was passed over it at a rate of 100 litres per hour. The catalyst was maintained at a temperature of 402° C. 32% of the isobutene underwent conversion. Of the converted material, 32% by weight consisted of useful oxygenated products.

We claim:

1. A process for the production of an oxidation catalyst which consists essentially of (1) contacting particles of a porous, high-melting, heat-resistant ceramic material with a molten catalytic material consisting essentially of a vanadyl vanadate of a metal selected from the group consisting of thallium, silver, potassium, sodium, lithium and rubidium, and (2) thereafter allowing the product to cool, whereby there is obtained a catalyst consisting essentially of the said ceramic material impregnated with the said solid vanadyl vanadate.

2. A process as claimed in claim 1 in which a potassium vanadyl vanadate catalyst is produced, the $$K_2O:V_2O_5$$

molar ratio being within the range of 0.001:1 to 0.3:1.

3. A process as claimed in claim 1 in which a thallium vanadyl vanadate catalyst is produced, the $Tl_2O:V_2O_5$ molar ratio being within the range of 0.001:1 to 0.3:1.

4. A process as claimed in claim 1 in which the porous heat resistant solid is selected from the group consisting of corundum, silica, silicon carbide or firebrick.

5. A process as claimed in claim 1 in which the catalyst has a size within a relatively narrow range extending from 1/32" to 3/64" for finely divided particles to 1/8" to 3/16" for granules.

6. The process of claim 1 including the final step of activating said oxidation catalyst by oxidizing naphthalene to phthalic anhydride with gaseous oxygen at a temperature of about 450° C. for a required period of up to 8 hours.

7. A process for the production of an oxidation catalyst which consists essentially of (1) fusing together vanadium pentoxide with an inorganic salt of a metal selected from the group consisting of thallium, silver, potassium, sodium, lithium and rubidium, (2) cooling the molten material to permit evolution of oxygen and the formation of the vanadyl vanadate of the said metal, (3) re-melting the said vanadyl vanadate, (4) introducing particles of a porous, high-melting, heat-resistant ceramic material, of the desired size into the melt, (5) thereafter withdrawing the said particles and allowing them to drain, and repeating these steps until the internal pore structure of said particles is coated with the said vanadyl vanadate.

8. A process for the production of an oxidation catalyst which consists essentially of (1) fusing together vanadium pentoxide and an inorganic salt of a metal selected from the group consisting of thallium, silver, potassium, sodium, lithium and rubidium, (2) dipping into said melt particles of a porous, high-melting, heat-resistant ceramic material of the desired size, (3) cooling the product thereby formed while permitting evolution of oxygen during the solidification and formation of the solid vanadyl vanadate of the said metal within the internal pores of said ceramic material.

9. A process for the production of an oxidation catalyst which consists essentially of (1) impregnating a porous, high-melting, heat-resistant ceramic material with a soluble salt of vanadium pentoxide and of a metal selected from the group consisting of thallium, silver, potassium, sodium, lithium and rubidium, and (2) thereafter calcining the thus-impregnated ceramic material, thereby forming the vanadyl vanadate of said metal within the pores of said ceramic material.

References Cited in the file of this patent

UNITED STATES PATENTS

| | | |
|---|---|---|
| 2,016,169 | Griffith | Oct. 1, 1935 |
| 2,157,965 | Pngratz | Oct. 18, 1949 |
| 2,485,073 | Shiffer | Oct. 18, 1949 |
| 2,698,306 | Matejczyk | Dec. 28, 1954 |
| 2,760,906 | Arey | Aug. 28, 1956 |
| 2,809,939 | Dixon | Oct. 15, 1957 |
| 2,824,880 | Wettstein | Feb. 25, 1958 |